April 7, 1953     J. G. JACKSON     2,633,682
MILLING BIT
Filed Oct. 14, 1950

INVENTOR.
John Gordon Jackson
BY
Lamphere and Van Valkenburgh
ATTORNEYS

Patented Apr. 7, 1953

2,633,682

UNITED STATES PATENT OFFICE 2,633,682

MILLING BIT

John Gordon Jackson, Denver, Colo., assignor to Eastman Oil Well Survey Company, Denver, Colo., a corporation of Delaware Application October 14, 1950, Serial No. 190,225

9 Claims. (Cl. 51—206)

This invention relates to bits and more particularly to an improved abrasive bit for milling a window in the side of a well casing or like structure. In the past these bits or cutters have been made from a special carbon steel or alloy steel and the milling has been accomplished in cooperation with a member called a whipstock which is permanently mounted in the casing and is provided with a deflecting surface to cause the bit to be forced into the wall of the casing to perform the milling of the window.

One of the objects of my invention is to produce an improved milling bit or cutter which is constructed of abrasive particles such as chips of diamond embedded in a suitable carrier or matrix to thereby establish a bit for milling windows in casings which are of such hardness that carbon steel milling bits are either incapable of cutting or cannot accomplish an efficient job of cutting.

A further object is to produce a milling bit or cutter having a cutting action established by abrasive particles and being so constructed that fluid can be circulated about the cutting surfaces at all times so as to lubricate and cool the bit during the entire milling operation.

Another object is to so embody liquid circulating grooves in the cutting surface and the bore of a milling bit or cutter that the grooves will not interfere with a smooth and efficient milling operation as the bit operates to cut a window in a casing, and further circulation will not be prevented in event the bore of the bit is filled with a core.

Still other general objects are to construct an abrasive particle bit for cooperation with a whipstock to mill windows in well casings or similar structure, which bit will accomplish its cutting operation in a most efficient manner, will accomplish cutting in less time than present carbon steel or other metal alloy milling bits, will be simple in construction, yet rugged throughout, and also capable of economical operation, notwithstanding a higher initial cost than present metal milling bits.

Other objects of the invention will become apparent from the following description taken in connection with the accompanying drawings in which.

Figures 1, 3:
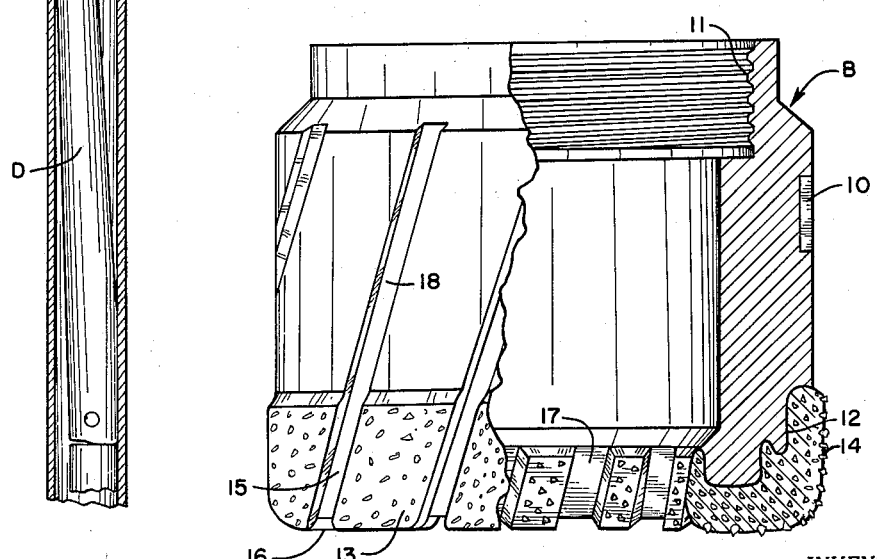
Figure 1 is a view of a milling bit embodying my invention and shown as being used with a whipstock to mill a window in a casing.
Figure 3 is a side view of the bit with parts in section and broken away so as to show additional details of construction.

Referring to the drawings in detail, there is disclosed in Figure 1 a casing C made of steel and placed in a well bore to provide a lining therefor. In many instances it is desirable to cut a window W in this casing so another bore can be drilled at an angle to that in which the casing is set. This operation is called "side tracking" and may be necessary for establishing a new drilling direction, for re-drilling work-over holes, for plugging back, for directional drilling by orientation, or for straightening crooked holes. Cutting of a window in the casing is accomplished by using the drill stem S of a rotary drilling rig which is caused to extend down through the casing by the employment of a series of sections joined together. These sections are hollow so that fluid can be circulated during any drilling operation. In order to mill out the window a milling cutter or bit will be attached to the lower end of the drill stem and this milling bit is indicated in Figure 1 by the letter B and constitutes a structure embodying my invention. In order to force the drilling bit out into engagement with the wall of the casing and thereby accomplish cutting through of the casing wall, there is employed a deflecting tool D which is commonly known as a whipstock. This whipstock is permanently placed in the casing at the desired point where cutting of the window is to be made and it will be permanently located in the casing, being left there after the milling operation is accomplished. The connecting of the whipstock in the casing is accomplished in a well known manner by the use of so-called "slips" and the details thereof are not believed to be necessary in connection with the new and improved milling bit which is the subject matter of this application.

In accordance with my invention, I construct my improved milling bit with a body 10 of general cylindrical shape. At the upper end of this body, which is slightly reduced, there are provided internal threads 11 and by means of these threads the bit can be threadedly connected to the lower end of the drill stem S which will have male threads thereon for cooperation with the internal threads. The lower end of the cylindrical bit body 10 is provided with an irregular surface, generally indicated at 12. This irregular surface extends completely around the lower end of the bit body. Moulded onto this bottom end of the bit body will be a matrix 13 and embedded therein will be small particles of abrasive material of extreme hardness, such as chips of diamonds, sapphires, carborundum, etc. These particles are indicated at 14. The matrix is made of any suitable abrasive resistant metal, but of less hardness than the particles, and its hardness can be varied as desired to suit conditions. If diamond particles are used, such can be of the black commercial type suitably crushed or constitute chips that may be part of diamond cuttings when manufacturing other diamond articles. These chips or particles of abrasives are mixed into the matrix material so as to be properly distributed therethrough and then this matrix material is moulded onto the lower end of the bit body by the employment of heat. The moulded on matrix and abrasive particles will be of such size with respect to the cylindrical body as to extend slightly beyond both the inner and outer walls of the body, as can be best seen in Figure 3. Thus, the body will not interfere with cutting action.

Figure 2:
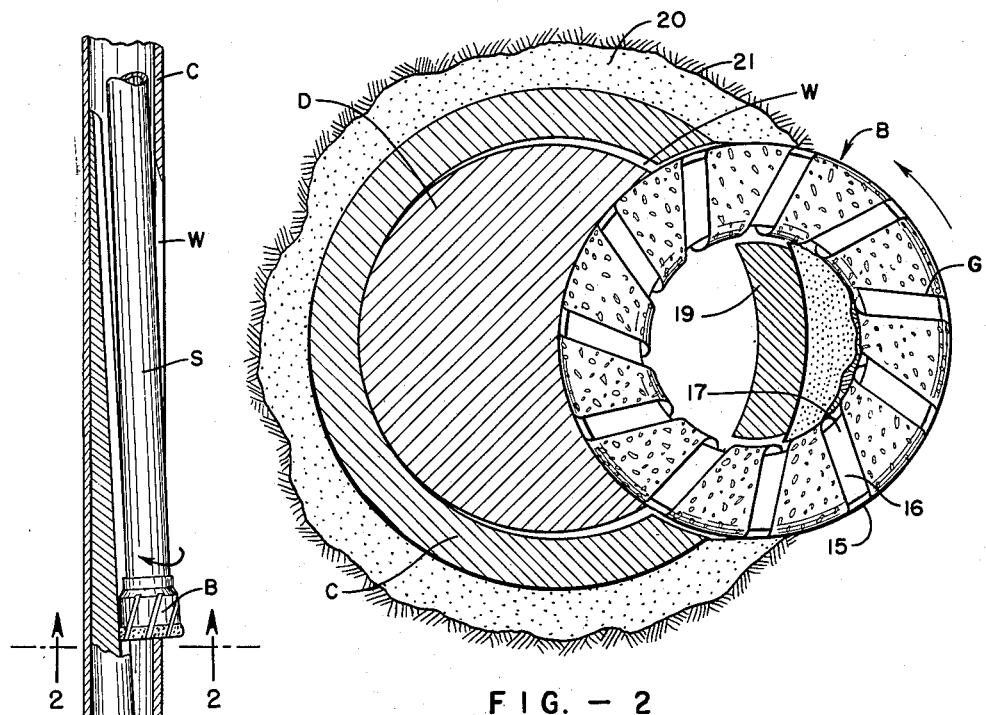
Figure 2 is a cross sectional view taken on the line 2—2 of Figure 1 and showing the bottom of the bit and its relation to the whipstock when cutting is being accomplished.

In moulding the matrix onto the bit body it will be provided with such a form so as to establish a series of grooves indicated by the letter G. These grooves, as can be seen in Figures 2 and 3, will each be made of three grooves or groove portions comprising the groove portion 15 in the outer side wall of the matrix, a groove portion 16 in the bottom or end surface of the matrix and another groove portion 17 in the inside wall of the matrix. All of the groove portions communicate with each other to form the entire groove G. In addition to the three grooved portions mentioned as being in the matrix, the groove G will also have an additional groove portion 18 in the outer surface of the bit body 10 which will constitute an extension of the groove portion 15 in the outer surface of the matrix. The number of grooves G are an odd number and all of these grooves G will be preferably equally spaced apart around the bit.

The groove portion 16 of each groove G, which portion is in the end surface of the matrix, will be at an angle to a radial line from the axis of the bit, all as is apparent from Figure 2 which is a view of the bottom of the milling bit. In other words, the plane in which the groove portion 16 is situated when extended towards the center of the bit will pass to one side of the axis of the bit, which, in the particular bit disclosed, is the right side due to the direction of rotation of the bit. The direction of rotation is indicated by the arrows in Figures 1 and 2.

The groove portions 17, which are on the inside of the matrix portion, will have an angular relation with respect to the axis of the bit, such angular relation being clearly shown in Figure 3. Each groove in the outside surface of the bit body and the matrix, constituting the groove portions 15 and 18, will also have an angular relation with respect to the axis of the bit. This angular relation is such that the portion of the groove in the matrix will be leading the remainder of the grooves, including the groove portion 18, as the bit rotates in the direction of the arrow, that is, a right hand rotation when viewed from the top of the bit or a counter clockwise direction when viewed from the bottom of the bit as viewed in Figure 2.

The provision of an odd number of grooves G in my improved diamond milling bit and the making of the portions of the grooves angularly positioned in a manner already described are important features of my invention. The grooves are provided in the milling bit to permit circulation of fluid at all times and thus insure that fluid will be passing over and around the bit during the milling operation to lubricate the bit, and further to carry off cuttings and permit dissipation of heat which will be generated by the milling operation when the material of the bit cuts through the steel constituting the wall of the casing. By having the grooves odd in number, no two grooves will be diametrically opposite each other and thus there will be smoother drilling with less likelihood of any two grooves crossing the casing walls at similar points simultaneously. The angular relationship of the grooves also insures that no groove, during the milling operation, can assume a position where a window edge of the casing can fit into a groove and thus cause a catching or locking between the bit and casing wall and thereby interfere with proper and free rotation of the bit. In other words, there can be no interfitting between any groove and any exposed edge part of the wall of the casing. This is readily apparent by viewing Figures 2 and 3 and noting the relationship of the grooves with respect to the window edge of the casing as the bit is rotating and the wall is being cut.

As the milling bit moves down the whipstock to cut the window W, there will be established, after the wall of the casing has first been cut through, a metal "sliver" indicated at 19 in Figure 2 which will come from the wall of the casing. This sliver will move up through the body of the bit and into the lower part of the drill stem. There will be no catching on this sliver by the bit, due to the angular position of the inside groove portions 17. As the bit continues to cut the window and is forced farther out of the casing by the whipstock, other material on the outside of the casing will also pass into the interior of the milling bit and the drill stem. This material may be cement, indicated at 20 in Figure 2, which may have been placed around the casing for setting the casing in the bore 21, also shown in Figure 2. The sliver from the casing wall and the other material which enters the drill bit and goes into the drill stem may be held therein by any suitable core catching means, not shown, as is well known practice.

During all the milling operation fluid can be circulated down the drill stem and down through the milling bit and to all surfaces of the abrasive structure which are performing cutting operations. This is insured by the grooves G. If any cutting from the casing wall or cuttings from the cement should enter the grooves, they will be readily washed on through. Due to the fact that the abrasive structure comprising the matrix and the abrasive particles moulded to the lower end of the bit body projects beyond both the inner surface and the outer surface of the cylindrical bit body, no core structure can be cut which will entirely plug the inside of the bit body. No casing wall structure or other substance, such as the cement, can be cut which will become engaged with the outer surface of the body. Thus, fluid coming down through the drill stem will pass around the "sliver" and core structure in the body of the bit and then reach the inner groove portion 17 where the fluid will flow to the end surface groove 16 and from there into the groove portions on the outer surface on the abrasive structure or matrix and up the side of the bit body and then continue on to the top of the well bore.

I have disclosed in this application a specific construction of a milling bit, but it is to be understood that this bit is an example only. The particular form of milling bit is especially adapted for the drilling of windows in casing made of extra hard steel. Where ordinary carbon steel milling bits would be practically useless and very costly to operate in cutting such casing, my improved bit will "do the job" and do it in an efficient manner. Other structural forms embodying the invention can be made without departing from the principles thereof. For example, the groove portions may be other than straight, as indicated, and their angular relation to the axis of the bit and radial lines of the bit may be different from that shown. Furthermore, it is to be understood that the particular bit disclosed is a milling bit, but the principles of the invention may be embodied in bits for other purposes. For example, my improved bit may be embodied in an abrasive type of bit which is primarily constructed for the taking of cores only from the earth's formations. Therefore, being aware of the possibility of modifications and uses, I desire it to be understood that the scope of the invention is not to be limited in any manner except in accordance with the appended claims.

What is claimed is:

1. In a bit for milling a window in an earth bore casing of metal, an annular structure for attachment to a rotatable member at one end and having at its other end a cutting structure comprising abrasive particles embedded in a material of lesser hardness than the particles, the end surface of the cutting structure having grooves therein extending across the end from the outer side of the tool to the inner side with each having such direction that no axis of any part of the groove will coincide with a radial line of the bit, said grooves also being so related to a radial line passing through their inner ends that their outer ends will be rearward of the radial line when the bit is being rotated to perform milling operations.

2. A milling bit as described in claim 1 having the grooves in its end surface straight and of an odd number.

3. A milling bit as described in claim 1 having its exterior wall also provided with grooves, each of which communicates with an end groove, said wall grooves extending at an angle to the axis of the bit and in a rearward direction from the end grooves when considering the direction of rotation of the bit during milling operation.

4. In a bit for milling a window in an earth bore casing of metal, an annular structure for attachment to a rotatable member at one end and having at its other end a cutting structure comprising abrasive particles embedded in a material of lesser hardness than the particles, the end surface of the cutting structure having grooves therein extending across the end from the outer side of the tool to the inner side and each extending in a general direction toward the axis of the tool but having such specific direction as to pass the same to side of the axis which said side will establish the outer end of the groove as the trailing end when the bid is rotated to perform milling operations.

5. In a bit, an annular structure for attachment at one of its ends to a rotatable member at one end and having at its other end a cutting structure comprising abrasive particles embedded in a material of lesser hardness than the particles, the end surface of the cutting structure having an odd number of grooves therein extending across the end from the outer side of the tool to the inner side and each extending in a general direction toward the axis of the tool but having such specific direction as to pass the same to one side of the axis, and other grooves extending from the outer ends of the end surface grooves rearwardly in the outer surface of the annular structure, said other grooves being at an angle to the longitudinal axis of the bit and the angle being so related to said axis when considering the normal direction of rotation of the bit that the lower ends of each said other grooves will be the leading ends.

6. A well casing cutter tool of the class described comprising a cylindrical body provided with means at one end for attachment to a rotatable member, and an annular member moulded to the other end of the body and consisting of an abrasive resistant matrix having embedded therein abrasive particles of a hardness greater than the matrix with said matrix and particles being a coherent mass and the mass joined to body, said annular moulded mass projecting beyond the inner and outer surfaces of the cylindrical body and having a plurality of grooves which extend across its exposed end surface, each groove in the end surface extending in a direction at an angle to a radial line passing through the inner end of the groove and the outer end of the groove being to the rear side of the radial line when considered with respect to the normal direction of rotation of the tool during milling operation.

7. A cutter tool as described in claim 6 having grooves in its outer wall, with each communicating at its lower end with an end surface groove, said outer wall grooves extending upwardly in the moulded mass and also in the cylindrical body.

8. A well casing cutter tool of the class described comprising a cylindrical body provided with means at one end for attachment to a rotatable member, and an annular member moulded to the other end of the body and consisting of an abrasive resistant matrix having embedded therein abrasive particles of a hardness greater than the matrix with said matrix and particles being a coherent mass and the mass joined to body, said annular moulded mass having a plurality of grooves each consisting of portions which extend across the exposed end surface of the mass and also rearwardly therefrom on its inner and outer surfaces, the portion of each groove in the end surface extending in a direction at an angle to a radial line passing through the inner end of the groove portion and the outer end of said portion being to the rear side of the radial line when considered with respect to the normal direction of rotation of the tool, and the inner and outer groove portions being at an angle to the longitudinal axis of the cutter tool with the lower ends thereof being the leading ends.

9. A cutter tool as described in claim 8 having the grooves with portions in its end surfaces and in its inner and outer surfaces of an odd number.

JOHN GORDON JACKSON.

REFERENCES CITED

The following references are of record in the file of this patent:

UNITED STATES PATENTS

| Number | Name | Date |
| --- | --- | --- |
| 2,147,843 | Jamar et al. | Feb. 21, 1939 |
| 2,174,980 | Heath et al. | Oct. 3, 1939 |
| 2,339,270 | Kelleher | Jan. 18, 1944 |

FOREIGN PATENTS

| Number | Country | Date |
| --- | --- | --- |
| 886,862 | France | Oct. 27, 1943 |